United States Patent [19]

Ito et al.

[11] Patent Number: 4,529,959
[45] Date of Patent: Jul. 16, 1985

[54] INPUT DEVICE

[75] Inventors: Kazuhiko Ito, Furukawa; Ikuo Utagawa, Miyagi, both of Japan

[73] Assignee: Alps Electric Co., Ltd., Japan

[21] Appl. No.: 575,525

[22] Filed: Jan. 31, 1984

[30] Foreign Application Priority Data

Jan. 31, 1983 [JP] Japan .......................... 58-12307[U]

[51] Int. Cl.$^3$ .............................................. H01C 7/22
[52] U.S. Cl. ...................................... 338/295; 178/18;
219/528; 219/549; 219/552; 200/86 R; 338/69;
338/99; 338/114; 338/314; 338/309
[58] Field of Search ............... 200/250, 264, 265, 260,
200/261, 5 A, 86 R; 338/69, 111, 114, 295, 314,
99, 308, 309, 100, 119; 178/18, 19; 219/528,
549, 552, 553

[56] References Cited

U.S. PATENT DOCUMENTS

| | | | |
|---|---|---|---|
| 501,543 | 7/1893 | Singer | 338/69 X |
| 1,598,056 | 8/1926 | Cooper | 338/69 X |
| 2,141,231 | 12/1938 | Trautwein | 338/69 X |
| 2,611,049 | 9/1952 | Roby | 200/86 R |
| 3,386,067 | 5/1968 | Costanzo | 338/100 |
| 3,617,666 | 11/1971 | Braue | 200/86 R |
| 3,699,492 | 10/1972 | Yoshihara | 338/69 |
| 3,911,215 | 10/1975 | Hurst et al. | 178/18 |
| 3,960,044 | 6/1976 | Nagai | 338/114 X |
| 3,968,467 | 7/1976 | Lampen et al. | 338/119 |
| 3,997,863 | 12/1976 | Luce | 338/69 |
| 4,172,216 | 10/1979 | O'Shea | 200/86 R |
| 4,203,088 | 5/1980 | Sado | 338/114 |
| 4,220,815 | 9/1980 | Gibson et al. | 178/18 |
| 4,268,815 | 5/1981 | Eventoff et al. | 338/69 |
| 4,293,734 | 10/1981 | Pepper, Jr. | 178/18 |
| 4,302,011 | 11/1981 | Pepper, Jr. | 178/19 X |
| 4,308,448 | 12/1981 | Beck et al. | 219/552 |
| 4,315,238 | 2/1982 | Eventoff | 338/99 |
| 4,319,078 | 3/1982 | Yokoo et al. | 178/18 |
| 4,444,998 | 4/1984 | House | 178/19 |

FOREIGN PATENT DOCUMENTS

| | | | |
|---|---|---|---|
| 1557588 | 12/1979 | United Kingdom | 338/114 |
| 2099063 | 6/1982 | United Kingdom . | |
| 2115555 | 9/1983 | United Kingdom . | |
| 2115556 | 9/1983 | United Kingdom . | |

*Primary Examiner*—Volodymyr Y. Mayewsky
*Attorney, Agent, or Firm*—Guy W. Shoup

[57] ABSTRACT

An input device for use in a display unit serving as a terminal of a computer has first and second insulating sheets and an insulating spacer sandwiched between the first and second sheets. The first sheet has first terminal leads on its both ends, while the second sheet has second terminal leads which extend in perpendicular relation to the first terminal leads. The upper surface is covered with a flexible, insulating, protective sheet. The spacer includes lattice-like conductors and consists of a material having cells of gas and elasticity and flexibility such as silicone foam. A fixed voltage is alternately applied across both ends of the first sheet and across both ends of the second sheet. When the protective sheet is depressed at a point P as by a depression pen, the position of the point is measured and represented by means of X- and Y-coordinates.

12 Claims, 6 Drawing Figures

INPUT DEVICE

FIELD OF THE INVENTION

The present invention relates to an input device for use in a display unit such as a cathode-ray tube serving as a terminal of a computer. More specifically, the invention relates to a contact type input device for detecting the position at which a contact pen or the like is pressed on a panel surface.

BACKGROUND OF THE INVENTION

Various devices of such kind have been heretofore proposed as, for example, electrode contact type devices constituting a thin film switch, optical matrix devices comprising a combination of a light pen and a photodetector for detecting coordinates by obstructions of optical paths, pressure type devices for detecting the pressure applied by touch, and surface acoustic wave devices for determining coordinates based on propagation time taken by a surface acoustic wave.

Among these devices, the electrode contact type devices are simpler in structure and cheaper than the other devices. However, coordinate input devices of the conventional electrode contact type structure tend to cause a higher contact resistance and are mechanically fragile, because those devices have been keyboard switches using a transparent plastic film on which a thin sheet of a metal, such as Ag and Pd, or a thin film of an oxide metal, such as $In_2O_3$, is formed over a given area by evaporation or sputtering. Therefore, these coordinate input devices have a poor yield and a short life. In one of the aforementioned thin film electrodes, fine powder of an electrically conductive metal is dispersed in a synthetic resin. However, the powder is not uniformly dispersed, and an accurate detection of coordinates is not possible. Further, a sufficient strength cannot be obtained.

SUMMARY OF THE INVENTION

In view of the foregoing, it is the main object of the present invention to provide an input device which is simple in structure and less expensive to fabricate, has a large mechanical strength, is capable of accurately detecting coordinates, has stable contact portions, and shows a strong resistance to noise.

Other objects of the invention will appear in the course of the description thereof which follows.

BRIEF DESCRIPTION OF THE DRAWINGS

FIG. 2 (b) is a wiring diagram of the components shown in FIG. 2 (a);

FIG. 3 (b) is a wiring diagram of the components shown in FIG. 3 (a); and

DETAILED DESCRIPTION OF THE INVENTION

Figure 1:
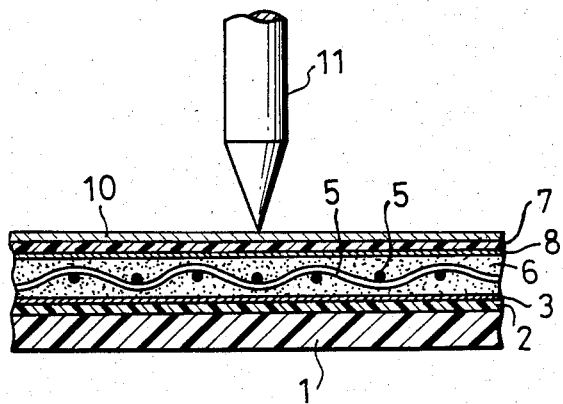
FIG. 1 is a cross-sectional view of an input device according to the present invention.

Referring to the drawings, there is shown an input device of a two-axis display unit for determining coordinates represented in terms of X- and Y-axes, in accordance with the present invention. The device has a base plate 1 on which a substantially square insulating sheet 2 is placed. A resistor layer 3 consisting of an electrically conductive paint to which carbon or other conductive material is appropriately added is uniformly formed on the insulating sheet 2. At the ends of the resistor layer 3 in the X-axis direction, terminal leads 4 are formed as can be seen from the plan view of the layer 3 of FIG. 2 (a). The terminal leads 4 are thin film electrodes made of Ag or other conductive metal material and formed on the resistor layer 3. As shown, the terminal leads extend out from end portions 4a and 4b, across which a fixed voltage is applied.

Placed on this first resistor layer 3 is an insulating spacer 6 in which a conductor 5 braided like a lattice is imbedded. The conductor 5 consists of a loose mesh braided from thin wires of a conductive material such as copper or bronze which is plated with gold or coated with carbon paint of a low resistance. The diameter of the wires is of the order of 0.05–0.2 mm, and these wires are arranged parallel. The aforementioned spacer 6 consists of a material having cells of gas and possessing elasticity and flexibility as, for example, silicone foam. When the spacer is not depressed, it holds the conductor 5 within and insulates the conductor at the upper and lower surfaces thereof. When it is depressed, the spacer deforms and easily lays the conductor 5 bare at the upper and lower surfaces. Both ends of the conductor 5, that is, the ends of the thin wires of the mesh, extend out from the side end surfaces of the insulating spacer 6 and are electrically connected to one end of a circuit containing the resistor layer 3.

Figure 3A:
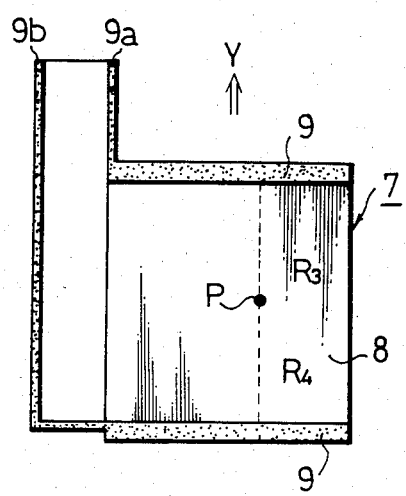
FIG. 3 (a) is a plan view of the device of FIG. 1 for showing the second insulating sheet, resistor layer and terminal leads of the device.
Figure 3B:
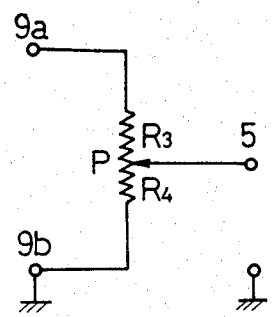

A second insulating sheet 7 is placed on the insulating spacer 6. As shown in FIG. 3 (a), a second resistor layer 8 is formed on the underside of the second sheet 7 in the same manner as the first resistor layer 3. The second resistor layer 8 is similar in shape and material to the first resistor layer 3 and has terminal leads 9 at both ends thereof. However, the leads 9 extend in the direction of the Y-axis, that is, in perpendicular relation to the first terminal leads 4. The given voltage is applied across end portions 9a and 9b independently of the first resistor layer 3. The conductor 5 extending out from the side end surfaces of the spacer 6 has one end electrically connected with a circuit including the resistor layer 8. The upper surface of the second insulating sheet 8 is coated with a flexible, insulating, protective sheet 10 made of polyurethane.

In the input device constructed as described above, the given voltage is applied across the end portions 4a and 4b of the terminal leads 4 along the X-axis and across the end portions 9a and 9b terminal leads 9 along the Y-axis as described previously. More specificially, the fixed voltage is alternately applied to the terminal leads 4 and 9, so that signals may be detected one after another for the X- and Y-axis directions.

Figure 4:
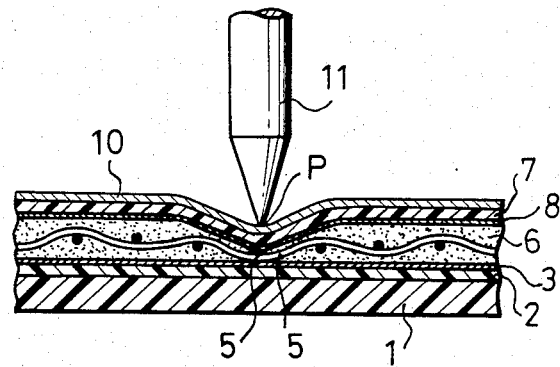
FIG. 4 is a cross-sectional view of the input device of FIG. 1 when it is put into work.

In the operation of the novel input device, when the insulating, protective sheet 10 is depressed by a tapering depression member 11 at a point P, as shown in FIG. 4, the conductor 5 is depressed via the sheet 10, the second insulating sheet 7 and the insulating spacer 6. Then, the spacer 6 above and below the conductor 5 is somewhat pushed aside and made thinner to a great extent. Hence, the conductor 5 comes into contact with the first and second resistors 3 and 8, respectively, and there occurs a short circuit. Accordingly, the electric potential at the point of depression P is detected in the X-axis and Y-axis directions through the conductor 5, while the voltage is alternatively applied to the first layer 3 and the second layer 8. Thus, the point P is determined by means of X- and Y-coordinates.

Figure 2A:
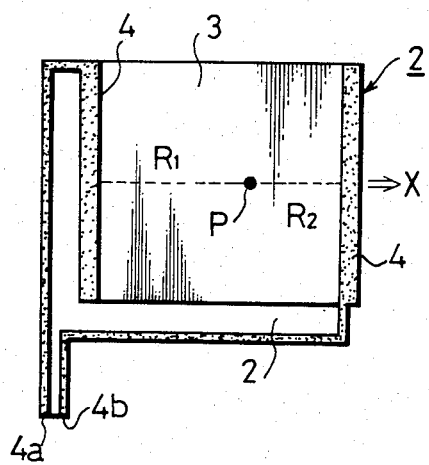
FIG. 2 (a) is a plan view of the device of FIG. 1 for showing the first insulating sheet, resistor layer and terminal leads of the device.
Figure 2B:
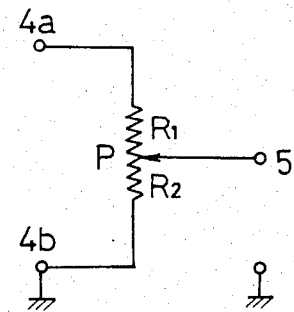

More specifically, it is assumed that the resistances to the point P as viewed from the sides of the input end portions 4a and 4b when the given voltage is applied across these end portions are $R_1$ and $R_2$, respectively. The position of the point P on the X-axis when the point P on the resistor layer 3 formed on the insulating sheet 2 as shown in FIG. 2 (a) is depressed is determined by the ratio of the resistance $R_1$ to the resistance $R_2$ corresponding to the position of the point P as shown in FIG. 2 (b), the ratio being measured by the voltage taken from the conductor 5. In exactly the same manner, it is assumed that the resistances to the point P as viewed from the sides of the input end portions 9a and 9b are $R_3$ and $R_4$, respectively, as shown in FIG. 3 (a). The position of the point P on the Y-axis when the point P on the second insulating sheet 7 is depressed is determined by the ratio of the resistance $R_3$ to the resistance $R_4$ corresponding to the position of the point P as shown in FIG. 2 (b), the ratio being measured by the voltage taken from the conductor 5.

In the illustrative embodiment, the metal mesh braided like a lattice is used as the conductor 5, and therefore even if the input device is quite thin, a certain strength is given to the conductor. Further, even if the resilience of the insulating spacer is small, the conductor can deform while sufficiently held in the spacer. The open space between the strands of the mesh may be appropriately dimensioned according to a desired specific application.

It is also to be understood that the conductor 5 is not limited to a mesh, but rather a thin film, a number of strip members or any other material may be used instead, provided that they satisfy the requirements including the mechanical strength, weight and conductivity. Furthermore, although the second insulating sheet 7 is formed independently of the insulating protective sheet 10, both may be joined together as by fusing the surface of the sheet 7 and then hardening it.

As hereinbefore described, in the novel device, both ends of the conductor 5 imbedded in the insulating spacer 6 are electrically connected with the one end of the circuit including the first resistor layer 3 and also with the one end of the circuit including the second resistor layer 8. Consequently, the contact of each of the resistor layers 3 and 8 with the conductor 5 only at one location permits direct detection of the electric potential in the X- and Y-axis directions through the conductor 5. In this way, the portion which makes contact for electric conduction can be only one conductor. Thus, the novel structure is much less affected by noise than a structure making use of contact between first and second resistor layers. As a result, a quite accurate determination of coordinates is made possible.

What is claimed is:

1. An input device for developing signals corresponding to the position of the application of pressure thereon, including first and second electrically insulating sheets each having respective resistance layers formed thereon to face one another, means for impressing a voltage across each of said resistance layers with the direction of the impressed voltage of one resistance layer being perpendicular to the direction of the voltage impressed across the other resistance layer, a compressible spacer of open-cell, electrically insulating material being held between said resistance layers, and means including a layer of electrically conductive material embedded within said spacer for mutually contacting said resistance layers upon application of pressure to one of said insulating sheets to deflect said one insulating sheet and associated resistance layer inwardly to compress said spacer and expose portions of the embedded conductive material to said resistance layers.

2. An input device as set forth in claim 1, wherein said conductive layer consists of lattice-like conductors.

3. An input device as set forth in claim 2, wherein said lattice-like conductors are formed by braiding thin metal wires into a lattice-like configuration.

4. An input device as set forth in claim 3, wherein said thin metal wires are plated with a noble metal having a good conductivity.

5. An input device as set forth in claim 3, wherein said thin metal wires are coated with a carbon paint of low resistance.

6. An input device as set forth in claim 1, wherein said conductive layer is made of one thin film conductor.

7. An input device as set forth in claim 1, wherein said conductive layer is a combination of a number of conductive strip members.

8. An input device as set forth in claim 1, wherein the open-cell material of the compressible spacer is made of silicone foam.

9. An input device as set forth in claim 1, including terminal leads for the first and second resistance layers and means for impressing a voltage across said first terminal leads alternately with impressing a voltage across said second terminal leads.

10. An input device according to claim 1, said conductive material being a mesh of interwoven conductors.

11. An input device according to claim 1, said conductive material being in the form of a sheet.

12. An input device according to claim 1, said voltage impressing means applying voltage to one resistance layer alternately with the application of voltage to the other resistance layer.

* * * * *